United States Patent
Hufnagl et al.

(10) Patent No.: US 7,308,842 B2
(45) Date of Patent: *Dec. 18, 2007

(54) BLIND FASTENER AND NOSE ASSEMBLY FOR INSTALLATION OF THE BLIND FASTENER

(75) Inventors: Gerhart Hufnagl, Tucson, AZ (US); Gilbert M. Lee, Tucson, AZ (US); Randall G. Torrence, Tucson, AZ (US)

(73) Assignee: Huck International, Inc., Tucson, AZ (US)

( * ) Notice: Subject to any disclaimer, the term of this patent is extended or adjusted under 35 U.S.C. 154(b) by 262 days.

This patent is subject to a terminal disclaimer.

(21) Appl. No.: 11/032,435

(22) Filed: Jan. 10, 2005

(65) Prior Publication Data

US 2005/0123373 A1   Jun. 9, 2005

Related U.S. Application Data

(63) Continuation-in-part of application No. 10/442,910, filed on May 20, 2003, now Pat. No. 6,868,757.

(51) Int. Cl.
*B25B 13/00* (2006.01)
*F16B 13/04* (2006.01)

(52) U.S. Cl. .............................. 81/55; 411/43
(58) Field of Classification Search ............ 81/55, 81/13; 411/43, 55, 57, 34, 37, 38
See application file for complete search history.

(56) References Cited

U.S. PATENT DOCUMENTS

| | | | |
|---|---|---|---|
| 2,030,167 A | 2/1936 | Miller |
| 2,324,142 A | 7/1943 | Eklund |
| 2,384,321 A | 9/1945 | Locs, Jr. |
| 2,479,075 A | 8/1949 | Martin |
| 2,760,399 A | 8/1956 | Rea |
| 2,789,597 A | 4/1957 | La Torre |
| 2,914,106 A | 11/1959 | Boyd |
| 2,971,425 A | 2/1961 | Blakeley |
| 3,136,203 A | 6/1964 | Davis |
| 3,143,917 A | 8/1964 | Conner |
| 3,196,918 A | 7/1965 | Hampton |
| 3,203,303 A | 8/1965 | Laisy |
| 3,236,143 A | 2/1966 | Wing |
| 3,279,304 A | 10/1966 | Hopkins |
| 3,322,449 A | 5/1967 | Becker |
| 3,345,900 A | 10/1967 | Villo |
| 3,365,998 A | 1/1968 | Zahodiakin |

(Continued)

*Primary Examiner*—Hadi Shakeri
(74) *Attorney, Agent, or Firm*—Greenberg Traurig, LLP

(57) ABSTRACT

A blind fastener for securing a plurality of workpieces is provided that has a sleeve, and a pin member. In an alternate embodiment, the blind fastener has a sleeve, a pin member and a nut. The sleeves have a head with a plurality of rearwardly sloping recesses disposed therein. The recesses are adapted to be engaged with a plurality of rearwardly sloping nibs disposed on one end of a nose secured to an installation tool. The pin members have a splined head adapted to be engaged with a splined driver secured to an installation tool. Use of the splined head on the pin member, the splined driver, rearwardly sloping recesses on the sleeve, and rearwardly sloping nibs on the nose eliminates camming out of the nibs from the recesses during installation of the blind fastener. A nose assembly for installation of the blind fastener is also provided.

20 Claims, 15 Drawing Sheets

U.S. PATENT DOCUMENTS

| | | |
|---|---|---|
| 3,453,927 A | 7/1969 | Moore |
| 3,653,294 A | 4/1972 | Nason |
| 4,237,768 A | 12/1980 | Volkmann |
| 4,376,604 A | 3/1983 | Pratt et al. |
| 4,405,273 A | 9/1983 | Ruhl et al. |
| 4,457,652 A | 7/1984 | Pratt |
| 4,630,510 A | 12/1986 | Belanger |
| 4,810,141 A | 3/1989 | Rainville |
| 4,836,062 A | 6/1989 | La Torre |
| 5,135,340 A | 8/1992 | Stinson |
| 5,498,110 A | 3/1996 | Stencel et al. |
| 5,634,751 A | 6/1997 | Stencel et al. |
| 5,913,648 A | 6/1999 | Lin |
| 6,247,883 B1 | 6/2001 | Monserratt |
| 2004/0231467 A1 | 11/2004 | Hufnagl et al. |

BLIND FASTENER AND NOSE ASSEMBLY FOR INSTALLATION OF THE BLIND FASTENER

CROSS REFERENCE TO RELATED APPLICATIONS

This application is a continuation-in-part application of U.S. Ser. No. 10/442,910 filed May 20, 2003 now U.S. Pat. No. 6,868,757.

FIELD OF THE INVENTION

This invention relates to blind fasteners for securing workpieces together, and more particularly to a blind fastener and nose assembly for installation of the blind fastener.

BACKGROUND OF THE INVENTION

Blind fasteners are commonly used to secure workpieces together when it is otherwise impossible to access the blind side of one of the workpieces. Typically, the workpiece that is accessible by an end-user is referred to as the accessible side workpiece and the workpiece that is inaccessible by an end-user is referred to as the blind side workpiece.

Blind fasteners have wide application in the aerospace industry. In aerospace applications, the blind fastener assembly of the present invention can be used to secure workpieces made of aluminum alloy, other metallic alloys, composites or combinations thereof.

An example of a previously available blind fastener is disclosed in U.S. Pat. No. 2,971,425. The principle components of the blind fastener of this prior art patent are a screw, a bushing, and a threaded nut. Generally, this prior art screw, bushing and threaded nut are similar in construction in certain aspects to the pin member and sleeve of the present invention. Distinctions between this prior art fastener and the present invention will focus on the embodiment of the prior art fastener that has recesses disposed in the head of the bushing that is adapted receive nibs of a nose that is affixed to a standard installation tool.

To install this prior art fastener, a nose with a plurality of nibs disposed on one side of the exterior surface thereof is provided that is affixed to a standard installation tool. Also, a driver configured to engage the driving head of the screw is provided that is affixed to the standard installation tool. The driver is engaged with the driving head of the screw and the nibs of the nose are disposed within the recesses of the bushing. The recesses in the bushing of this prior art fastener would need to be relatively deep like the recesses used in the commercial embodiments of the fasteners shown and described in U.S. Pat. Nos. 5,498,110 and 5,634,751. The deep recesses are needed in order to promote engagement between the nibs of the nose and the recesses of the bushing. Unfortunately, the use of deep recesses would weaken the bushing. In operation, the driver would rotate the screw and the nibs of the nose would engage the recesses in the head of the bushing in an attempt to prevent rotation of the bushing relative to the screw. Formation of the blind side bulb is supposed to be facilitated by threading the screw into the stationary bushing.

Such an operation would not effectively form the blind side bulb to clamp a plurality of workpieces together because the nibs of the nose would cam-out of the recesses during the installation of this prior art fastener. When the nibs cam-out of the recesses, the bushing rotates relative to the nose thereby causing wear damage to the nibs of the nose due to the abrasion of the nibs rotating against the head of the bushing. As can be appreciated, the nose would need to be frequently replaced due to the wear the nibs would experience in such a system. Additionally, the rotation of the bushing relative to the screw is undesirable from the standpoint of forming the blind side bulb. Optimum installation performance and reliability in bulb formation are not achieved with such an approach.

Rotation of the bushing would also cause abrasion or scraping of the head of the bushing by the nibs rotating against the head of the bushing. These results are not only visually apparent, but can also deteriorate the corrosion resistant properties of the bushing. Factors such as improper bulb formation, inconsistent structural clamp up and shear strength compromise the integrity of this prior art blind fastener.

With this prior art fastener, an end-user of the fastener attempts to prevent cam-out of the nibs from the recesses of the bushing by exerting a pushing force against the installation tool in order to maintain the engagement of the nibs with the recesses of the bushing. As can be appreciated, the end-user would become fatigued with applying such a force against the installation tool.

Of particular distinction to U.S. Pat. No. 2,971,425, the recesses in the head of the sleeve of the present invention slope rearwardly towards the blind side workpiece. These recesses are adapted to be engaged with nibs disposed on one end of a nose of a nose assembly affixed to a standard rotary installation tool. These nibs also slope rearwardly towards the blind side workpiece. Engagement of the sloping nibs with the sloping recesses is particularly advantageous in preventing rotation of the sleeve relative to the pin member during installation of the blind fastener of the present invention. Utilization of sloping nibs and recesses eliminates cam-outs. As such, the problems associated with cam-outs related to the design of U.S. Pat. No. 2,971,425 is eliminated. Additionally, by eliminating the cam-out problem associated with prior art fasteners by using the rearwardly sloping nibs and recesses, the recesses of the present invention are relatively shallow as compared to the deep recesses used in the commercial embodiment of the fasteners shown and described in U.S. Pat. Nos. 5,498,110 and 5,634,751. The shallow recesses of the present invention do not significantly weaken the sleeve of the present invention like the deep recesses used in the prior art.

Additionally, the driving head of the pin member of the present invention has splines or threads disposed on the exterior surface of the driving head. As used herein, the term "splines" means splines or threads. These splines are adapted to be engaged with a splined driver of a nose assembly affixed to a standard rotary installation tool. The splined engagement between the driving head and the driver is particularly advantageous in simultaneously pulling the installation tool towards the fastener during actuation of the tool to ensure proper engagement of the nibs with the recesses and rotatably torquing the pin member to effectively form the blind side bulb of the fastener. The pulling feature of the splined engagement between the pin member and driver to ensure engagement of the nibs with the recesses also eliminates the problems associated with cam-outs related to the design of U.S. Pat. No. 2,971,425.

SUMMARY OF THE INVENTION

It is an object of the invention to provide a blind fastener that pulls an installation tool towards the blind fastener during installation of the blind fastener.

It is another object of the invention to provide a blind fastener that does not have an installation tool cam out of the blind fastener during installation of the blind fastener.

It is another object of the invention to provide a blind fastener that has a sleeve component with relatively shallow recesses that do not significantly weaken the sleeve.

It is another object of the invention to provide a nose assembly that pulls an installation tool towards the blind fastener during installation of the blind fastener.

It is another object of the invention to provide a nose assembly that does not cam out of the blind fastener during installation of the blind fastener.

Certain objects of the invention are obtained by providing a blind fastener for securing a plurality of workpieces together. The workpieces have an accessible side workpiece and a blind side workpiece. The blind fastener has a sleeve with a body that is internally threaded at one end of the sleeve and a head at the other end of the sleeve. The threaded portion of the sleeve is adjacent to an internally smooth portion of the sleeve. The threaded portion of the sleeve transitions to the smooth portion of the sleeve, and the smooth portion of the sleeve has a reduced wall thickness relative to the threaded portion of the sleeve. The head has a plurality of rearwardly sloping recesses disposed in the head of the sleeve that are adapted to be engaged with a plurality of rearwardly sloping nibs disposed on one end of a nose secured to an installation tool. The recesses are relatively shallow. The blind fastener additionally has a pin member with an elongated shank. The shank has a straight smooth portion received within the smooth portion of the sleeve and a threaded portion at one end of the pin member that is threadedly engaged with the threaded portion of the sleeve. The pin member has a first head adjacent to the shank that is seated within the sleeve and a second splined head positioned at the other end of the pin member. The pin member has a breakneck groove between the first head and the second head. The breakneck groove is adapted to fracture in torsional shear in response to a relative rotational force applied to the fastener with an installation tool that facilitates threading of the threads of the pin member with the threads of the sleeve, and deforming into a bulb that portion of the sleeve that is of a reduced wall thickness relative to the threaded portion of the sleeve which is adjacent to an outer surface of the blind side workpiece.

Other objects of the invention are obtained by providing an alternate blind fastener for securing a plurality of workpieces together. The blind fastener has a generally tubular sleeve body received within openings in the workpieces. The sleeve body has a rearward tapered end projecting rearwardly beyond the blind side workpiece, and an enlarged body head for engagement with the outer surface of the accessible side workpiece. The head has a plurality of rearwardly sloping recesses disposed in the head of the sleeve that are adapted to be engaged with a plurality of rearwardly sloping nibs disposed on one end of a nose secured to an installation tool. The recesses are relatively shallow. The blind fastener also has a pin member that is identical to the pin member described in the paragraph above. The blind fastener additionally has a nut with an internally threaded bore threadedly engaged with the threads of the pin member. One end of the nut is located adjacent to the rearward tapered end of the sleeve body and is adapted to be engaged with the rearward tapered end of the sleeve body in response to a relative installation force applied to the fastener with an installation tool that facilitates threading of the threads of the pin member with the threads of the nut and deformation of the one end of the nut into a bulb to secure the plurality of workpieces together as the nut is pulled over the rearward tapered end of the sleeve body.

Other objects of the invention are obtained by providing a nose assembly adapted to install either of the blind fasteners described above. The nose assembly has a nose, a driver, an ejector and a spring. The nose has an internal bore, and one end of the nose has a plurality of rearwardly sloping nibs disposed thereon that are adapted to engage the rearwardly sloping recesses disposed in the sleeve of the blind fastener. The other end of the nose is adapted to be secured to an installation tool. The driver has an internal bore, and one end of the driver has a portion of the internal bore with splines disposed therein that are adapted to engage the splined head of the pin member. The other end of the driver is adapted to be secured to an installation tool. The driver is disposed within the internal bore of the nose and rotatably movable within the bore relative to the nose. The ejector is disposed in the internal bore of the driver, and is adapted to eject the splined head of the pin member after it has been set. The spring is disposed in the internal bore of the driver, and applies a relative axial force on the ejector to engage the ejector with the splined head of the pin member.

DETAILED DESCRIPTION OF PREFERRED EMBODIMENTS

Figure 1:
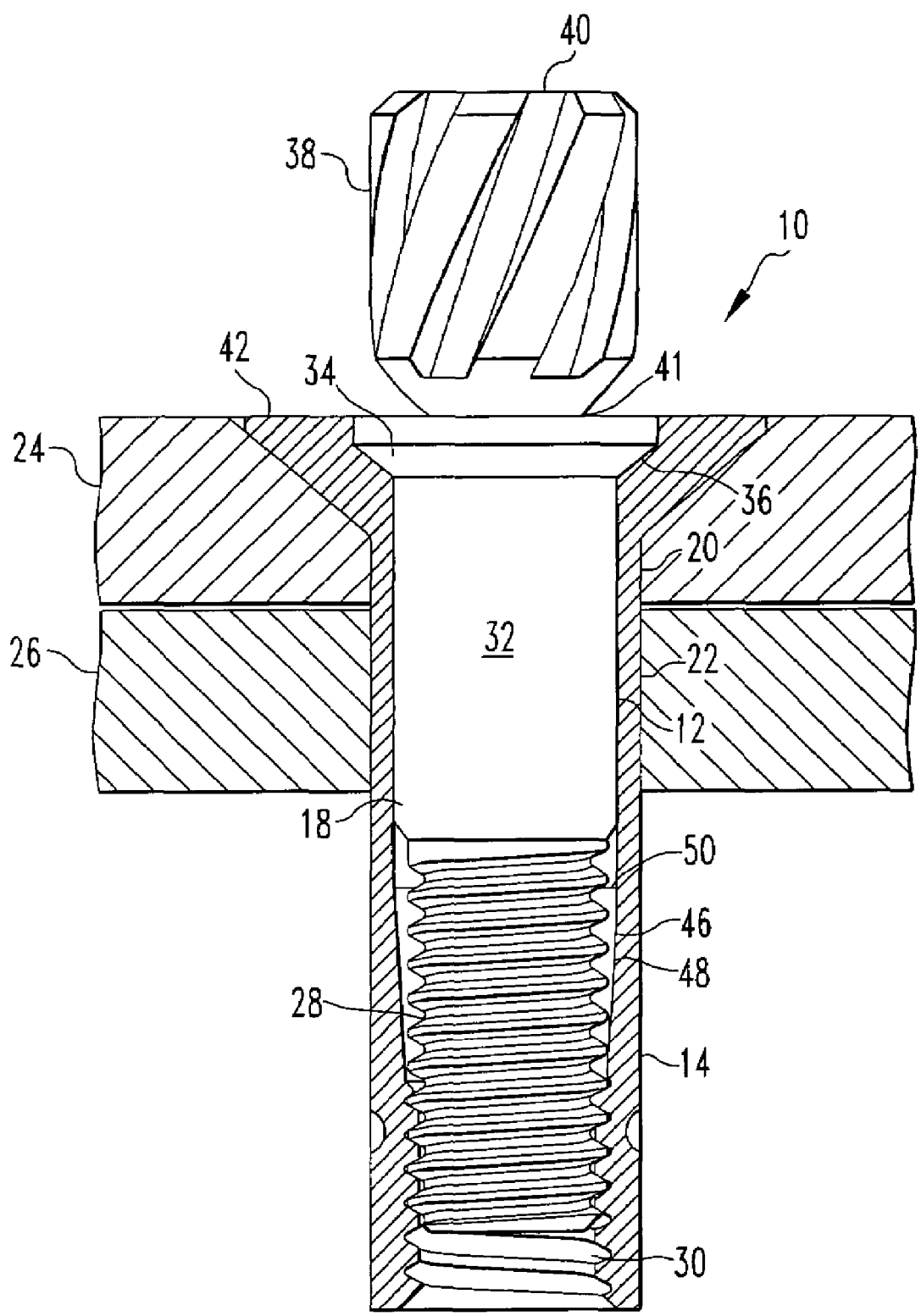
FIG. 1 is a partial cross-sectional view of the fastener of the present invention showing the components of the fastener after the fastener has been inserted through aligned openings in a plurality of workpieces.

Looking now to FIG. 1, a fastener 10 is shown to include a pin member 12 and a sleeve 14. In the fastener industry, pin member 12 may be referred to as a bolt, a screw, a spindle or a stem and sleeve 14 may be referred to as a bushing, nut or nut body. Pin member 12 has an elongated shank 18 which extends through aligned openings 20 and 22 in a pair of workpieces 24 and 26, respectively, to be secured together. A threaded portion 28 at one end of shank 18 is adapted to threadedly engage an internally threaded portion 30 of the sleeve 14 that is an integral component of the sleeve 14. The threaded portion 28 of the shank 18 has a diameter that is less than a smooth portion 32 of the shank 18 adjacent to the threaded portion 28. The pin member 12 is provided with a head 34 adjacent to the smooth portion 32 that is adapted to seat on an annular, outwardly facing, seat 36 at the outer end of the sleeve 14. In the particular construction illustrated, the head 34 is frustoconical and the seat 36 is complementarily tapered so that the pin member 12 is countersunk into the sleeve 14. Adjacent to the head 34 and also forming a portion of the pin member 12 is another head 38 having splines or threads 40 that are engageable by a suitable driver attached to an installation tool. Between the heads 34 and 38 is a breakneck groove 41 that defines the weakest point of the pin member 12 that is adapted to fracture in torsional shear in response to the rotational force applied to head 38 after the fastener 10 has been set, thereby providing the pin member 12 with a flush configuration relative to the sleeve 14 after the fastener 10 has been set.

The sleeve 14 has a body that has a cylindrical shape with a smooth exterior surface that has a slight clearance fit or press fit through openings 20 and 22 of the workpieces 24 and 26. The sleeve 14 also has a head 42 at one end that is typically sunk flush with the outside surface of the accessible side workpiece 24. Alternatively, the head 42 could be protruding from the outer surface of the accessible side workpiece 24. The head 42 could have a round head, hex head or other suitable shape as is well known in the fastener industry. The sleeve 14 has an internally threaded portion 30 at the other end of the sleeve 14 that is adapted to threadedly engage the threaded portion 28 of the pin member 12. The threaded portion 30 has a greater thickness than an internal smooth portion 46 of the sleeve 14. The wall thickness of the smooth portion 46 is greatest adjacent to the threaded portion 30. In one embodiment, the thickness of the smooth portion 46 is gradually reduced along a tapered section 48 of the sleeve 14 to a location 50 outside the blind side workpiece 26. At such location 50, the wall thickness of the smooth portion 46 of the sleeve 14 remains substantially the same until reaching the head 42 of the sleeve 14. The tapered section 48 of the sleeve 14 intended for bulb 52 formation is optionally locally induction annealed in order to facilitate bulb 52 formation. The tapered section 48 additionally facilitates bulb 52 formation against the blind side workpiece 26 in substantially all grip ranges of the fastener 10. In an alternate embodiment, the thickness of the smooth portion 46 could be abruptly reduced by a step (not shown) in the sleeve 14 to a wall thickness that remains substantially the same until reaching the head 42 of the sleeve 14. The smooth portion 46 of the sleeve 14 adjacent to the outer surface of workpiece 26 with reduced wall thickness relative to the threaded portion 30 could be locally induction annealed in order to facilitate bulb 52 formation.

Figure 3:
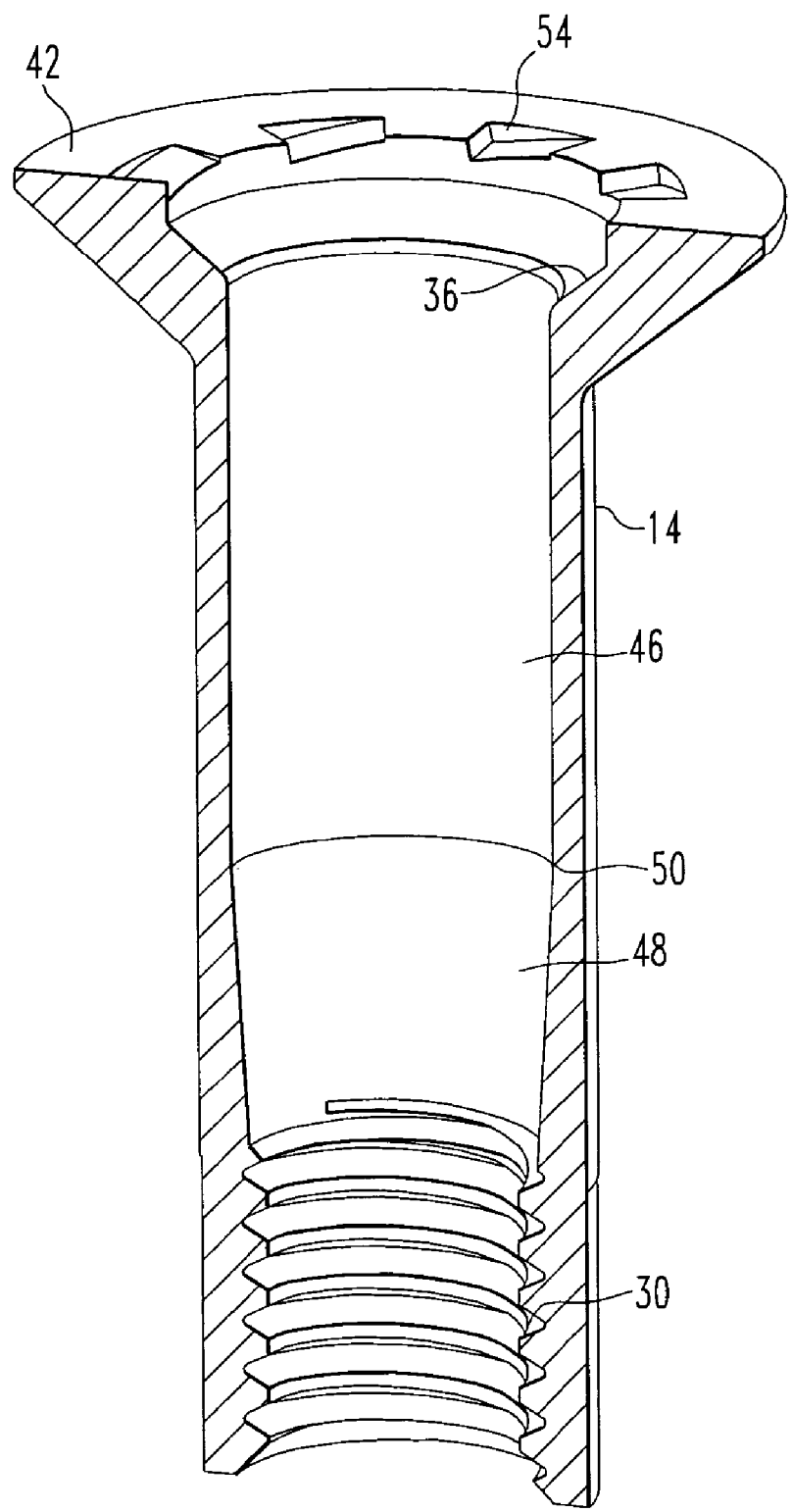
FIG. 3 is a cross-sectional isometric view of the sleeve of the present invention showing a plurality of sloped recesses disposed in the head of the sleeve.
Figure 3A:
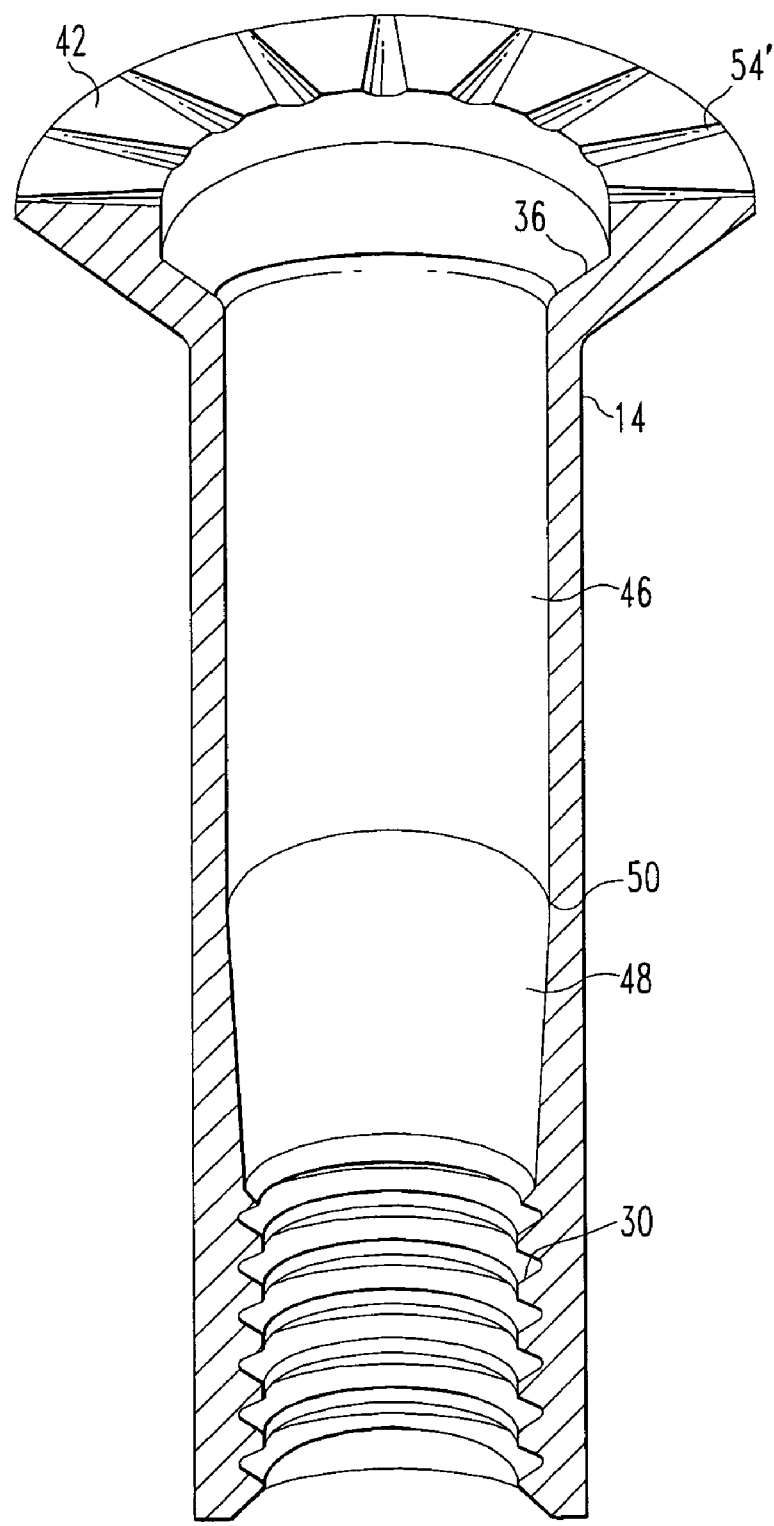
FIG. 3A is a cross-sectional isometric view of an alternative embodiment of the sleeve of the present invention showing a plurality of sloped recesses disposed in the head of the sleeve.
Figure 4:
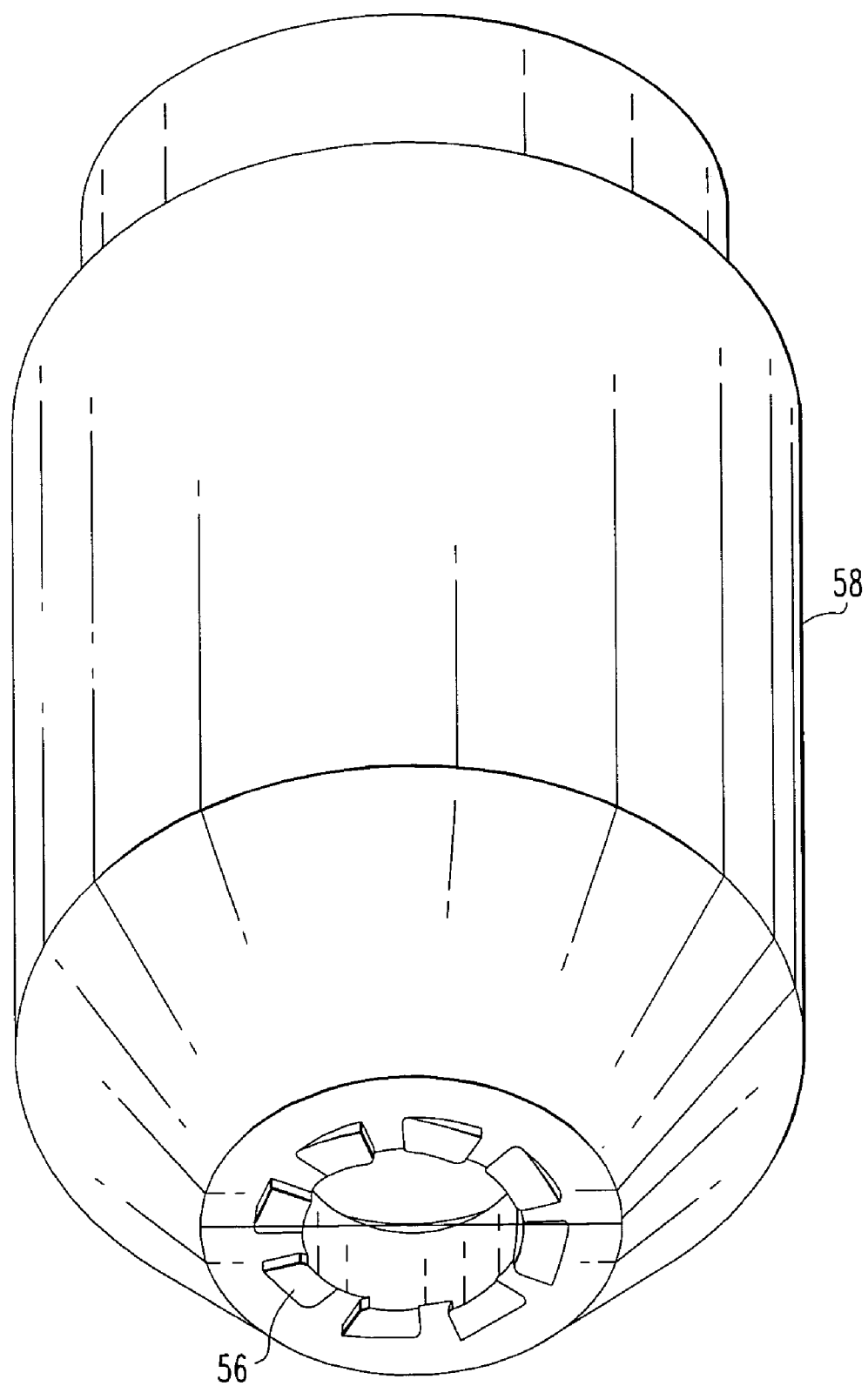
FIG. 4 is a bottom isometric view of the nose of the present invention showing a plurality of sloped nibs disposed on one end of the nose.

With reference to FIG. 3, the head 42 of the sleeve 14 has a plurality of recesses 54 disposed therein that are adapted to receive a plurality of protruding nibs 56 of the nose 58 of FIG. 4. Preferably, the recesses 54 slope rearwardly toward the blind side workpiece 26 and are relatively shallow. The relatively shallow construction of the recesses 54 does not significantly weaken the sleeve 14 of the present invention like the deep recesses used in prior art blind fasteners. The plurality of recesses 54 are disposed in the head 42 of the sleeve 14 in a generally circular orientation. The circular orientation is particularly advantageous in that the circular orientation does not weaken the head 42 by using cross recesses. Alternatively, the recesses 54 can be formed in any configuration that allows the head 42 of the sleeve 14 to be engaged with the nibs 56. For example, the recesses 54 could be in the orientation of a hexagon, a square, a cross-slot configuration, or a single slot configuration as long as the nibs 56 of the nose 58 have a matching configuration. Alternatively, as shown in FIG. 3A, recesses 54' could be provided that have a sunburst configuration or daisy petal configuration. The recesses 54' extend radially outwardly in the head 42 of the sleeve 14, slope rearwardly toward the blind side workpiece 26 and are relatively shallow. The relatively shallow construction of the recesses 54' does not significantly weaken the sleeve 14 of the present invention like the deep recesses used in prior art blind fasteners.

Figure 4A:
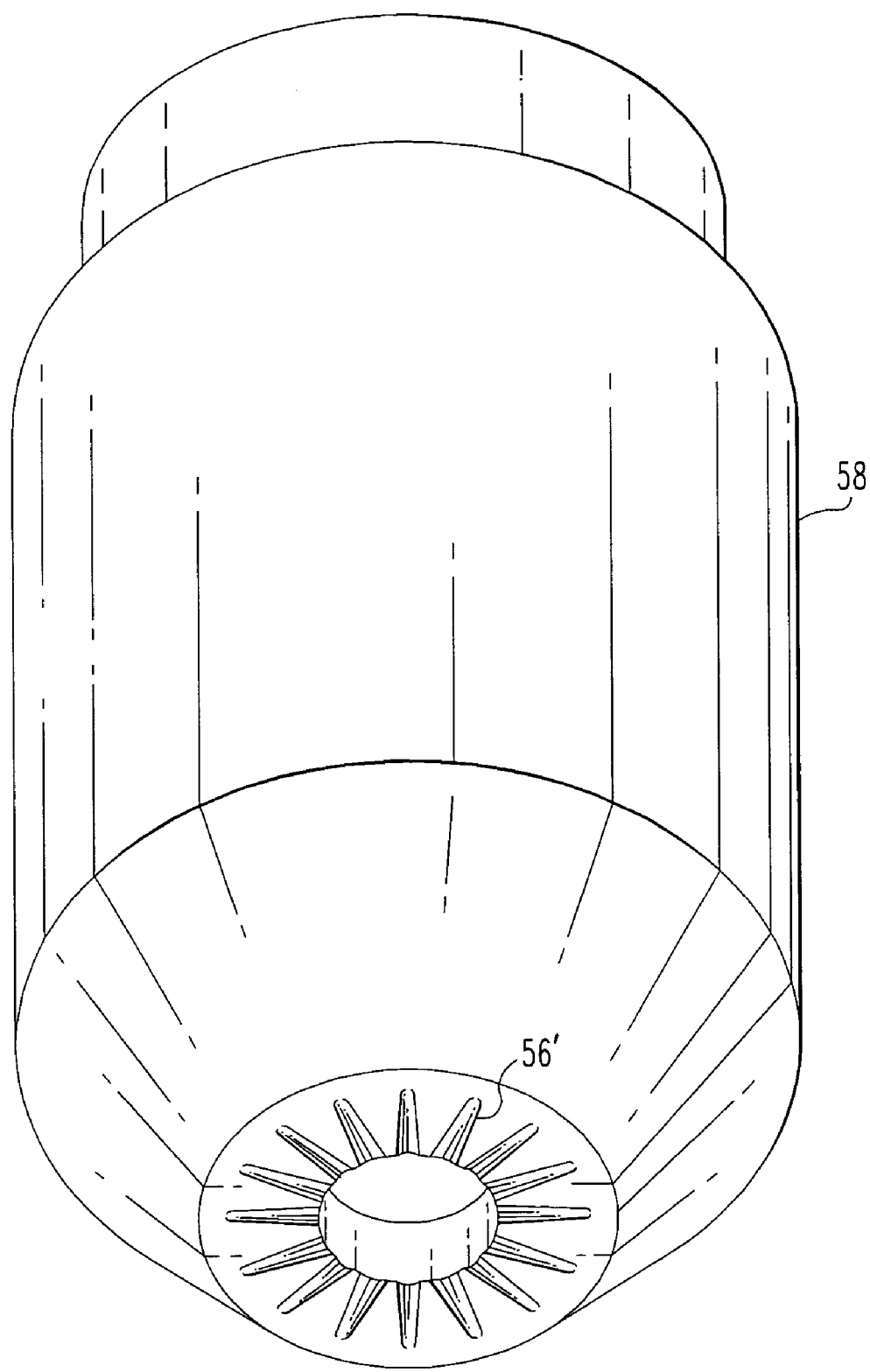
FIG. 4A is a bottom isometric view of an alternative embodiment of the nose of the present invention showing a plurality of sloped nibs disposed on one end of the nose.
Figure 5:
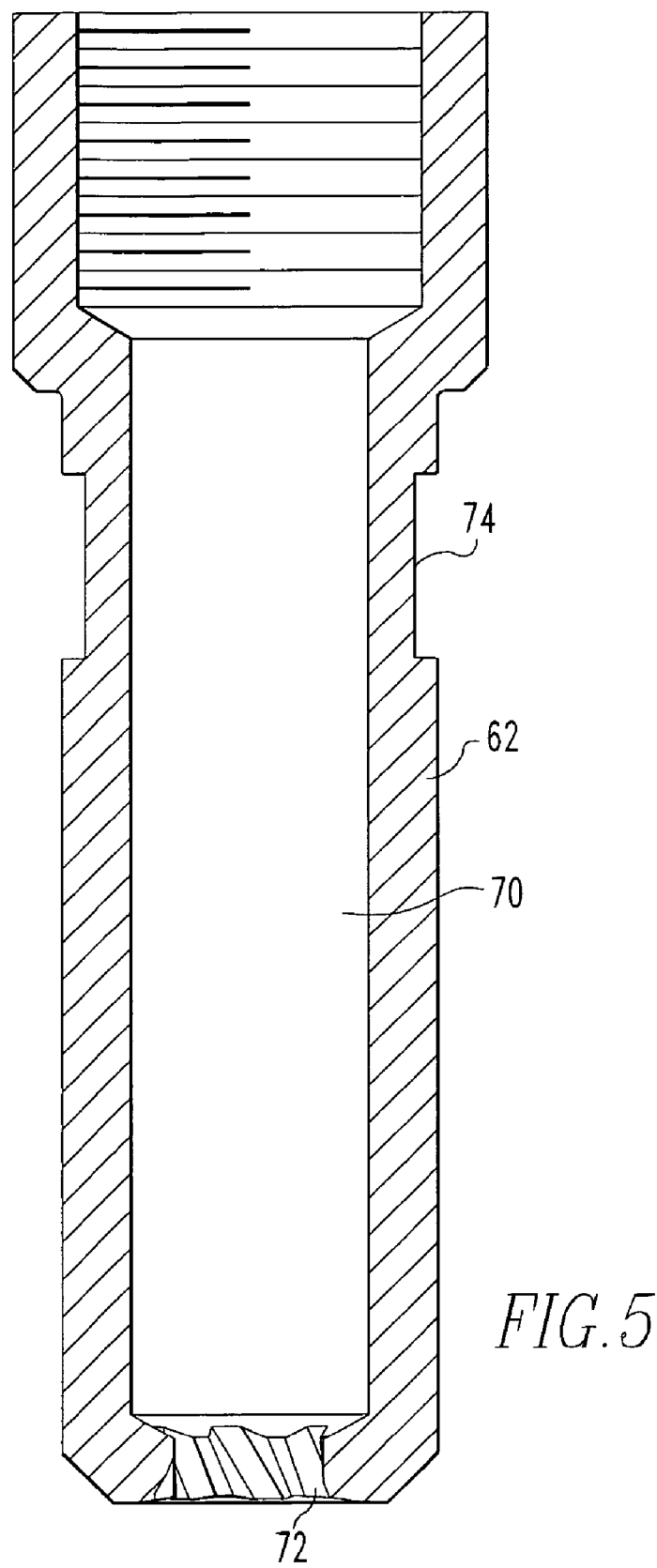
FIG. 5 is a cross-sectional view of the driver of an installation tool of the present invention showing a splined portion disposed within an internal bore of the driver.

Likewise, as with the recesses 54, the number of nibs 56 can vary and can be in many different orientations and forms. The plurality of nibs 56 can be formed in any configuration that allows the head 42 of the sleeve 14 to be engaged with the nose 58. In FIG. 4, the nibs 56 are disposed on the nose 58 in a generally circular orientation. Alternatively, the nibs 56 could be in the orientation of a hexagon, a square, a cross slot configuration, or a single slot configuration as long as the recesses 54 of the sleeve 14 have a matching configuration. Preferably, as with the recesses 54, the nibs 56 slope rearwardly toward the blind side workpiece 26. As previously mentioned, the rearward slope of the recesses 54 and nibs 56 is particularly advantageous in eliminating any camming out of the nose 58 from the sleeve 14 during setting of the fastener 10. Alternatively, as shown in FIG. 4A, nibs 56' could be provided that have a sunburst configuration or daisy petal configuration. The nibs 56' extend radially outwardly on the nose 58 and slope towards the blind side workpiece 26. The rearward slope of the recesses 54' and nibs 56' is particularly advantageous in eliminating any camming out of the nose 58 from the sleeve 14 during setting of the fastener 10. Additionally, the nibs 56' are preferably made of a non-deformable material such that the nibs 56' will not deform during installation of the fastener 10.

Figure 6:
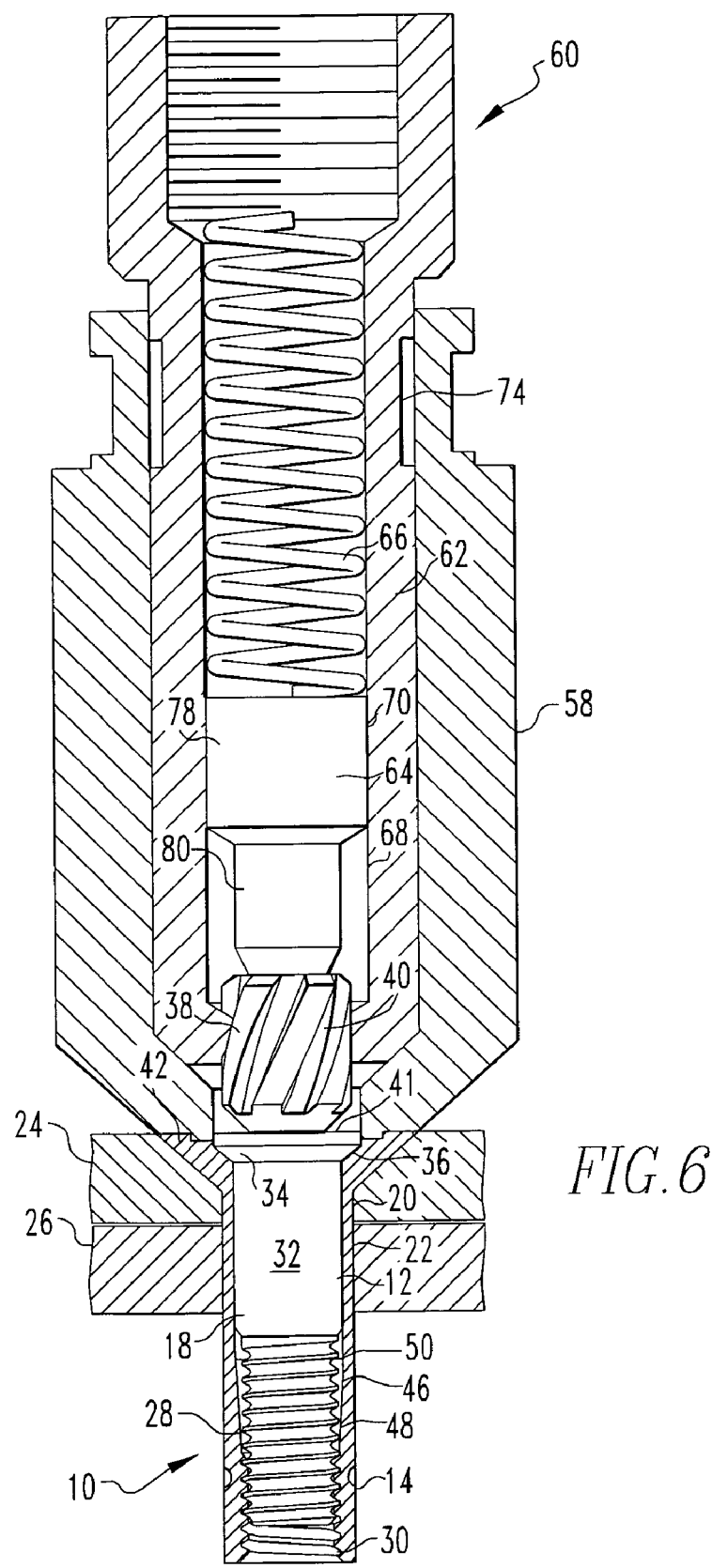
FIG. 6 is a partial cross-sectional view of the fastener and nose assembly of the present invention showing the components of the fastener and the nose assembly engaged with the fastener after the fastener has been inserted through aligned openings in a plurality of workpieces.
Figure 7:
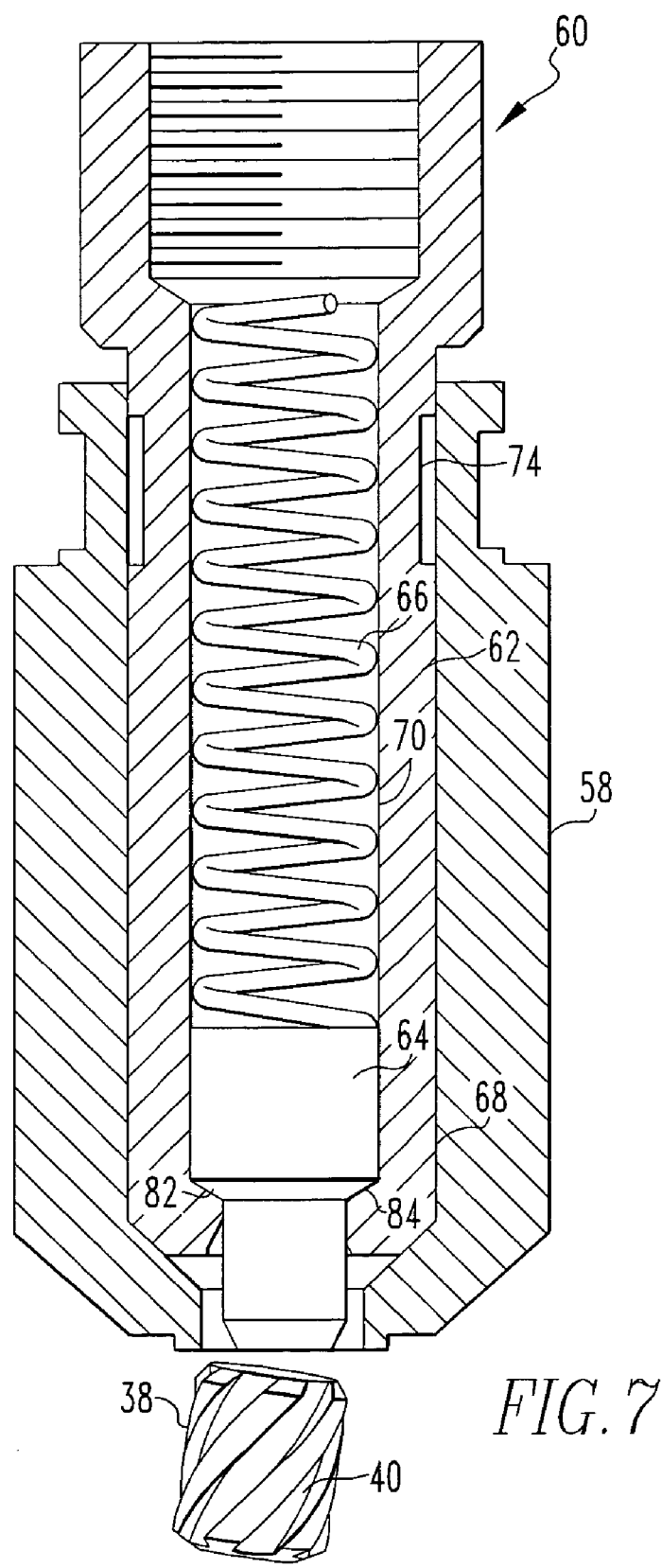
FIG. 7 is a partial cross-sectional view of the splined head of the fastener and nose assembly of the present invention showing these components after the fastener has been set.

With reference to FIG. 6, a nose assembly 60 is shown that is attached to a standard rotary installation tool (not shown). Details of the installation tool have been omitted for the purpose of simplifying the FIGS. and describing the details of the present invention it being noted that the nose assembly 60 could be attached to any number of standard rotary installation tools with minor modifications to the nose assembly 60 in order to secure the nose assembly 60 to such installation tools. As can be seen in FIG. 6, the nose assembly 60 generally consists of the nose 58, a driver 62, an ejector 64 and a spring 66. The nose 58 has an internal bore 68 that is adapted to receive a driver 62 that has an internal bore 70 that is adapted to receive the ejector 64 and the spring 66. As shown in FIG. 4, the nose 58 has a plurality of nibs 56 disposed on one end of the nose 58. For the sake of simplifying the appearance of FIG. 4, the nose 58 is not shown with a flange disposed on the nose 58 as shown in FIGS. 6 and 7. The driver 62 is disposed within the bore 68 of the nose 58. At one end of the bore 70 of the driver 62 are splines or threads 72 that are adapted to engage the complementary shaped splines or threads 40 of the pin member 12. As previously mentioned, the splined engagement of the driver 62 and pin member 12 is particularly advantageous in pulling the installation tool towards the sleeve to assure reliable tool engagement of the nibs 56 with recesses 54. Optionally, on the exterior surface of the driver 62 are wrenching flats 74. The wrenching flats 74 are adapted to be engaged with standard tooling in order to threadedly engage threads of the driver 62 to a rotary drive shaft (not shown) of a standard rotary installation tool (not shown). It should be noted that the installation tool rotatably drives the driver 62 during actuation of the installation tool whereas the nose 58 is held stationary relative the rotatable driver 62. The function of the ejector 64 is to eject the head 38 after installation of the fastener 10 is completed. The ejector 64 and the spring 66 are disposed within the bore 70 of the driver 62. The spring 66 is compressibly held between the ejector 64 and the rotary drive shaft (not shown). The ejector 64 has a first diameter portion 78 and a second diameter portion 80. The first diameter portion 78 of the ejector 64 is of a diameter slightly less than the diameter of the internal bore 70 that does not have splines 72 disposed thereon and has a diameter that is greater than the diameter of the internal bore 70 that has splines 72 disposed thereon. The second diameter portion 80 of the ejector 64 is of a diameter slightly less than the diameter of the internal bore 70 that has splines 72 disposed thereon to enable the second diameter portion 80 of the ejector 64 to pass through the splined area of the internal bore 70 after the fastener 10 has been set to eject head 38 from the nose assembly 60 as shown in FIG. 7. Since the first diameter portion 78 has a diameter greater than the diameter of the internal bore 70 that has splines 72 disposed thereon, the ejector 64 remains within the internal bore 70 after the fastener 10 has been set. As shown in FIG. 7, the ejector 64 has head 82 adjacent to the second diameter portion 80 that is adapted to seat on an annular, outwardly facing, seat 84 at the area adjacent to the splines 72 of the driver 62. In the particular construction illustrated, the head 82 is frustoconical and the seat 84 is complementarily tapered so that the ejector remains within the driver 62 after head 38 is ejected from the nose assembly 60.

Prior to installing the fastener 10 into workpieces 24 and 26, the fastener 10 is assembled. Referring to FIG. 1, the assembly process comprises a series of steps which result in the portion of the sleeve 14 that is threaded being threadedly engaged with the pin member 12. Next, the body of the sleeve 14 undergoes a dimpling process (not shown) wherein a small portion of an outer surface of the body of the sleeve 14 is physically deformed against the pin member 12. The dimpling process results in a small portion of the sleeve 14 material being displaced against the pin member 12 to cause sufficient engagement to prevent loosening of the pin member 12 from vibration after installation. Preferably, the dimpling is performed on the exterior surface of the sleeve adjacent to that portion of the sleeve 14 that is threadedly engaged with the pin member 12. The assembly process of the fastener 10 is then complete and the fastener 10 is prepared for installation.

The installation of the assembled fastener 10 involves the fastener 10 being used to secure a plurality of workpieces 24 and 26 together. The fastener 10 is inserted through aligned openings 20 and 22 in the workpieces 24 and 26 wherein the head 42 of the sleeve 14 is received against the outer surface of the accessible side workpiece 24, and a portion of the threaded portion 30 of the sleeve 14 extends out from the workpiece 26 and is adjacent to the outer surface of the blind side workpiece 26.

A rotary installation tool (not shown) with nose assembly 60 is provided to set the fastener 10. The splines or threads 40 of the pin member 12 are engaged with the complementary splines or threads 72 of the driver 62. Upon actuation of the tool by the end-user, the driver 62 is rotatably driven within the bore 68 of the nose 58 while the nose 58 is held stationary relative to the driver 62. The splined engagement between the pin member 12 and nose assembly 60 simultaneously pulls the nose assembly towards the fastener 10 during actuation of the tool to ensure proper engagement of the nibs 56 with the recesses 54 and rotatably torques the pin member 12 to effectively form the bulb 52 of the fastener 10. Relative axial movement of head 38 pushes ejector 64 within the internal bore 70 of the driver 62 that does not have splines and compresses spring 66 as shown in FIG. 6. As the pin member 12 is rotatably torqued and a relative axial force is applied to the nose assembly 60 during actuation of the installation tool, the nibs 56 of the nose 58 engage the complementary recesses 54 of the sleeve 14 which prevents the sleeve 14 from rotating relative to the nose 58 since the nose 58 is held stationary relative to the rotatably driven driver 62. Also, the rearward slope of the nibs 56 and nose 58 towards the blind side workpiece 26 prevents the nose 58 from canning out of the recesses 54 during the installation of the fastener 10. As previously mentioned, the problems associated with cam-outs related to the design of U.S. Pat. No. 2,971,425 are eliminated with the approach of the present invention.

As the installation tool rotates the pin member 12 and holds the sleeve 14 stationary, it is significant to note that there is no abrading or scratching of the head 42 of the sleeve 14 by the nibs 56 of the nose 58. Due to the engagement that is maintained between the nibs 56 and the recesses 54 during installation of the fastener 10, no slipping of the sleeve 14 relative to the nose 58 can occur. The recesses 54 and the nibs 56 are sloping rearwardly towards the blind side workpiece 26 and, as a result, provides consistent and predictable results and no slipping between the sleeve 14 and the nose 58 due to cam-outs.

Figure 2:
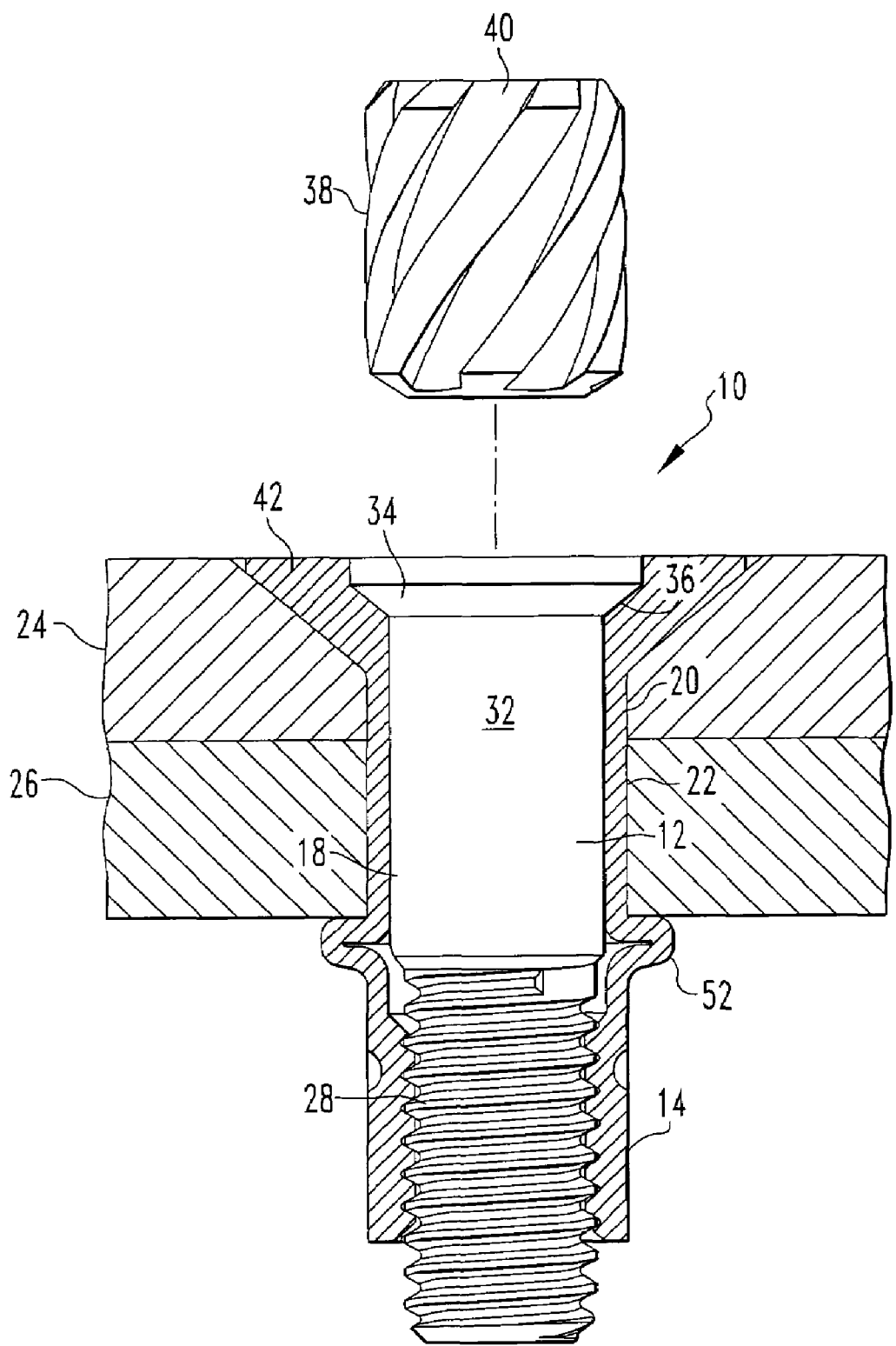
FIG. 2 is a partial cross-sectional view of the fastener of the present invention showing the components of the fastener after the fastener has been inserted through aligned openings in a plurality of workpieces and has been set.

The installation load applied by the installation tool results in the pin member 12 being further threaded with the sleeve 14 while deforming that portion of the sleeve 14 that is of a reduced wall thickness relative to the threaded portion 30 of the sleeve 14 that is adjacent to an outer surface of the blind side workpiece 26 to form the bulb 52 as shown in FIG. 2. When the bulb 52 is fully formed, further rotation of the pin member 12 stops. At this point, torsional load builds up in the pin member 12 and the breakneck groove 41 will fracture in torsional shear and break away along with the head 38 as shown in FIGS. 2 and 7. At this point, the spring 66 applies force against ejector 64 which ejects the severed head 38 from the nose assembly 60. Since the first diameter portion 78 has a diameter greater than the diameter of the internal bore 70 that has splines 72 disposed thereon, the ejector 64 remains within the internal bore 70 after the fastener 10 has been set. As shown in the FIGS. 2 and 7, the head 38 breaks away from the pin member 12 without any damage to the head 42. The remaining portion of the pin member 12 is flush with the outer surface of the head 42 of the sleeve 14.

In an alternate embodiment, it is possible to use the splined or threaded 40 head 38 of the pin member 12, the rearwardly sloping recesses 54 and nibs 56, and the relatively shallow recesses 54 of the present invention in multiple piece sleeve blind fasteners. For example, the splined 40 head 38 of the pin member 12, the rearwardly sloping recesses 54 and nibs 56, and the relatively shallow recesses 54 of the present invention could be used in the blind fasteners shown and described in U.S. Pat. Nos. 2,971,425, 5,498,110 and 5,634,751 . The contents of these patents are incorporated by reference as if fully set forth herein.

Figure 8:
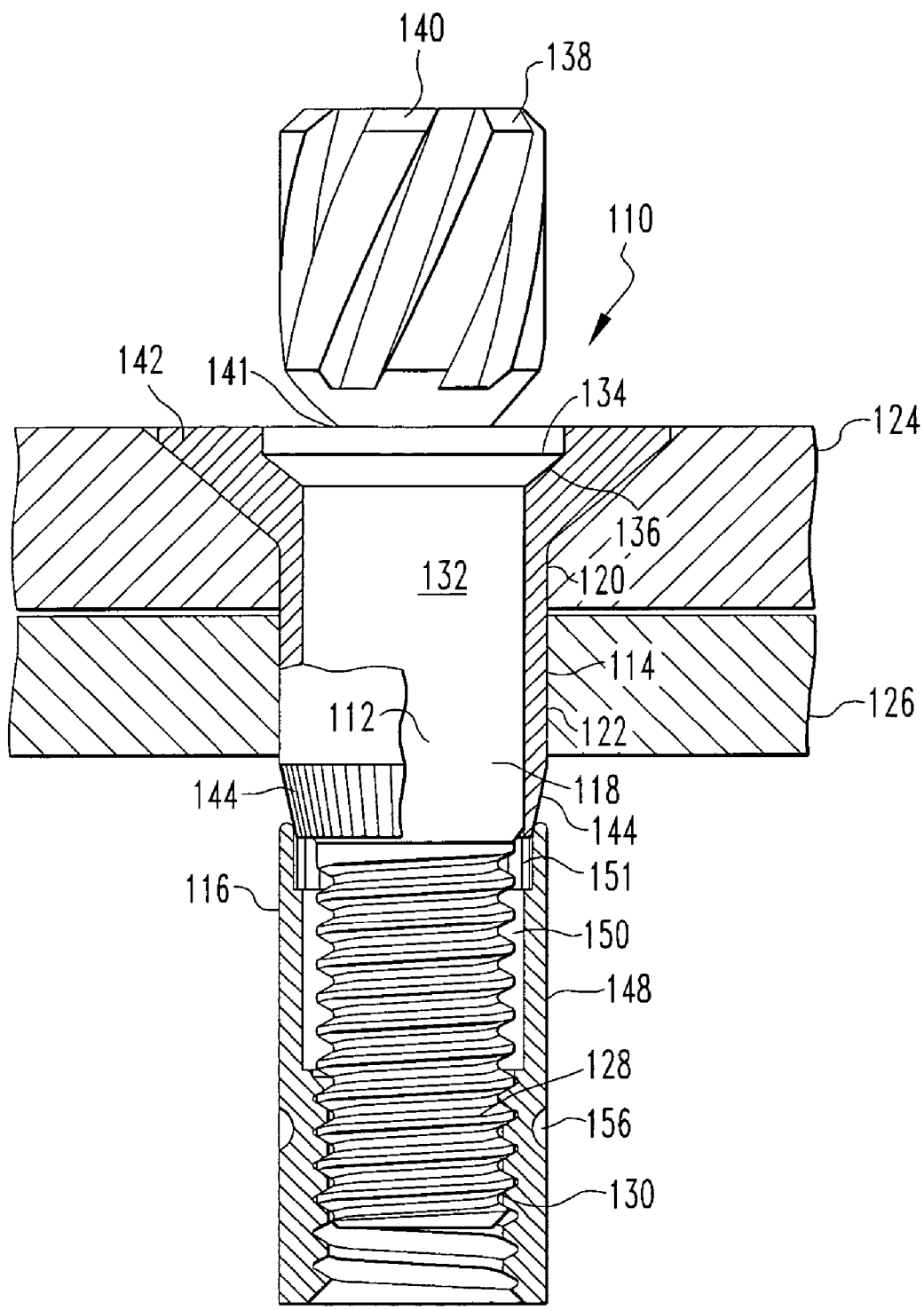
FIG. 8 is a partial cross-sectional view of an alternative embodiment of the fastener of the present invention showing the components of the fastener after the fastener has been inserted through aligned openings in a plurality of workpieces.

Looking now to FIG. 8, a fastener 110 is shown to include a pin member 112, a sleeve 114 and a nut body 116. In the fastener industry, pin member 112 may be referred to as a bolt, a screw, a spindle or a stem and sleeve 114 may be referred to as a bushing, nut or nut body. Pin member 112 has an elongated shank 118 which extends through aligned openings 120 and 122 in a pair of workpieces 124 and 126, respectively, to be secured together. A threaded portion 128 at one end of shank 118 is adapted to threadedly engage an internally threaded portion 130 of the nut body 116. The threaded portion 128 of the shank 118 has a diameter that is less than a smooth portion 132 of the shank 118 adjacent to the threaded portion 128. The pin member 112 is provided with a head 134 adjacent to the smooth portion 132 that is adapted to seat on an annular, outwardly facing, seat 136 at the outer end of the sleeve 114. In the particular construction illustrated, the head 134 is frustoconical and the seat 136 is complementarily tapered so that the pin member 112 is countersunk into the sleeve 114. Adjacent to the head 134 and also forming a portion of the pin member 112 is another head 138 having splines or threads 140 that are engageable by a suitable driver attached to an installation tool. Between the heads 134 and 138 is a breakneck groove 141 that defines the weakest point of the pin member 112 that is adapted to fracture in torsional shear in response to the rotational force applied to head 138 after the fastener 110 has been set, thereby providing the pin member 112 with a flush configuration relative to the sleeve 114 after the fastener 110 has been set.

Figure 10:
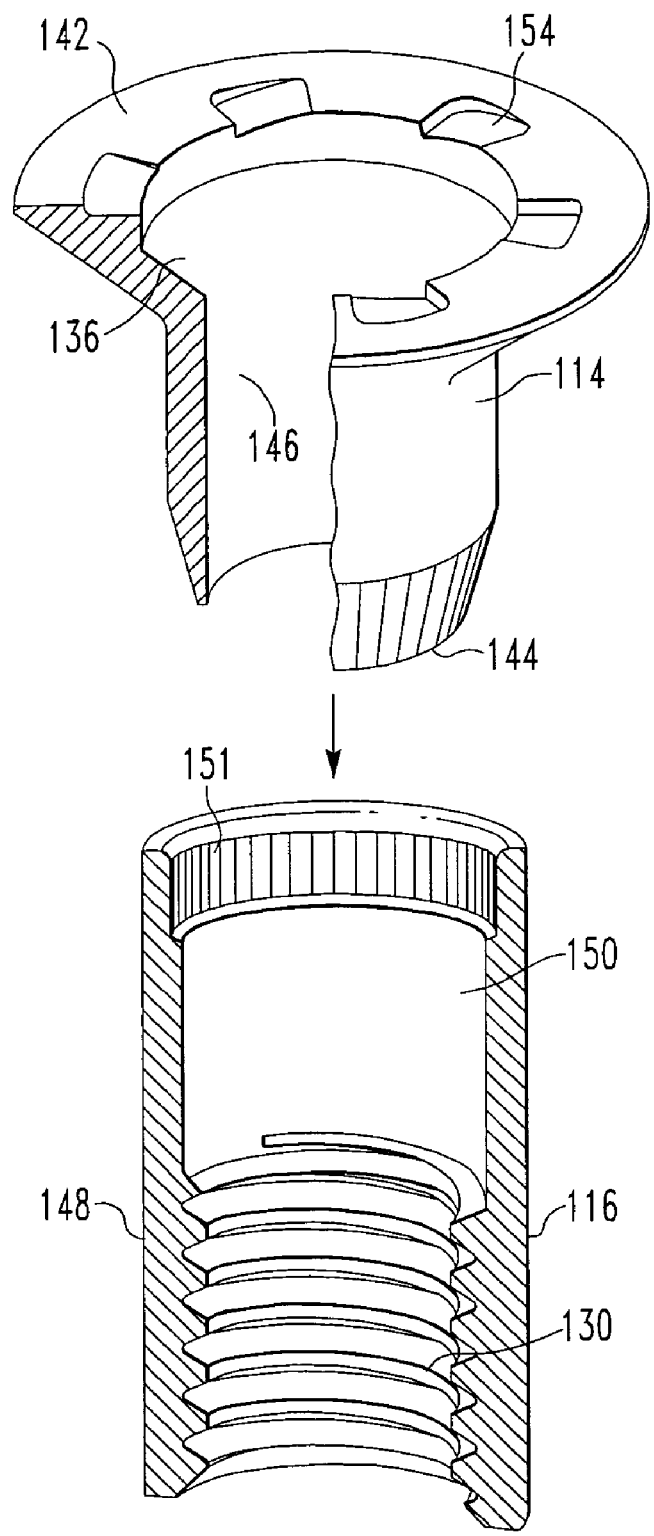
FIG. 10 is a cross-sectional isometric view of the sleeve and the nut body of an alternative embodiment of the fastener of the present invention showing a plurality of sloped recesses disposed in the head of the sleeve.
Figure 11:
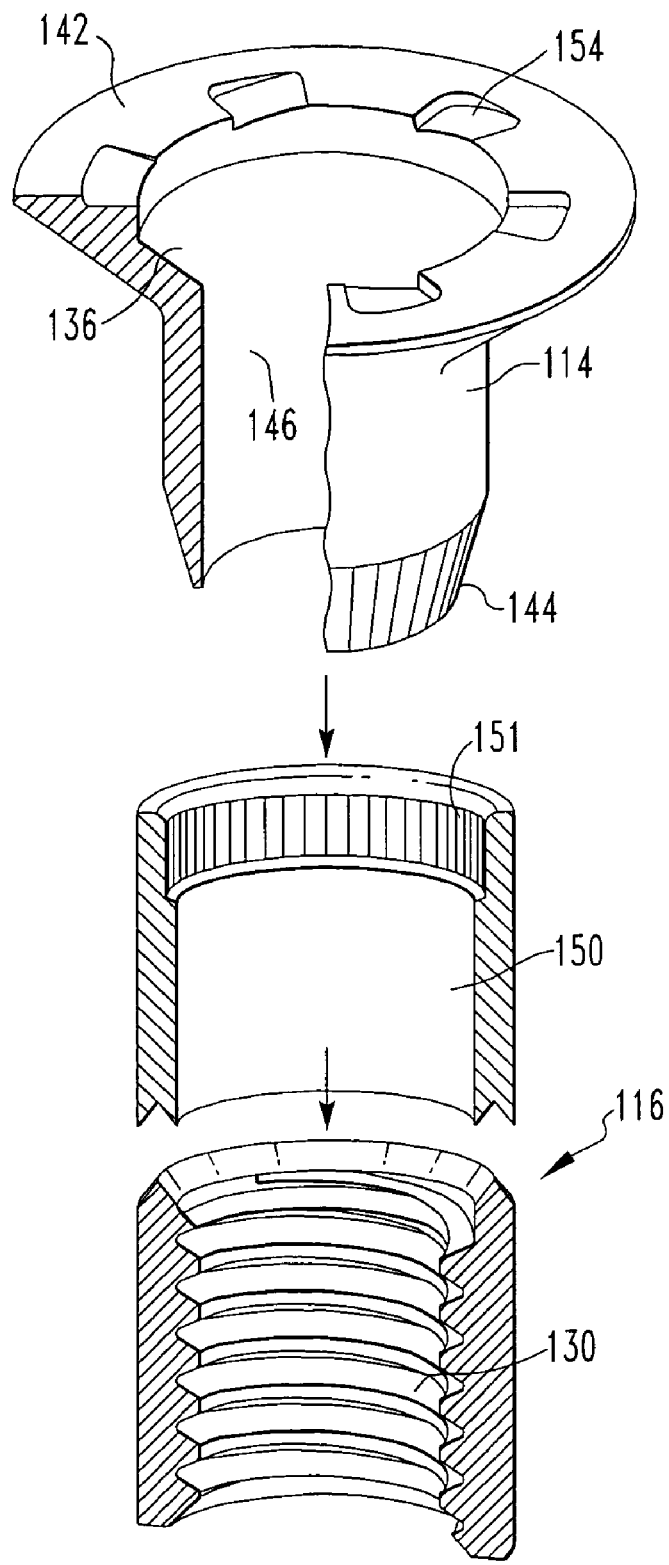
FIG. 11 is a cross-sectional isometric view of the sleeve and the nut body of an alternative embodiment of the fastener of the present invention showing a plurality of sloped recesses disposed in the head of the sleeve and the nut body comprising a threaded nut and a separate deformable sleeve.

The nut body 116 has a body that has a cylindrical shape with a smooth exterior surface. A threaded portion 130 at one end of the nut body 116 is adapted to threadedly engage the threaded portion 128 of the pin member 112. As can be seen in FIG. 10, the threaded portion 130 has a wall 148 of a preselected thickness. The threaded portion 130 of the nut body 116 transitions to an internal smooth portion 150 of the nut body 116 with a wall 148 of a reduced preselected thickness relative to the thickness of the wall 148 in the threaded portion 130. The smooth portion 150 has a diameter greater than the diameter of the threaded portion 128 of the pin member 112 to provide a slight clearance fit with the threaded portion 128 of the pin member 112. At another end of the nut body 116 is an annular recessed ring 151 which transitions from the smooth portion 150. The annular recessed ring 151 has a wall 148 of a reduced preselected thickness relative to the thickness of the wall 148 in the threaded portion 130 and the internal smooth portion 150. The annular recessed ring 151 may be knurled, abraded, notched or provided with any number of alternative frictional surfaces to promote engagement of the nut body 116 with the tapered end 144. Optionally, an insert (not shown) may be included within the annular recessed ring 151. The insert would preferably be made of a material having a lower tensile strength than the outer portion of the annular recessed ring 151, such as DELRIN, CELCON, TEFLON and NYLON synthetic materials, fiberglass reinforced versions of the above or softened metal. DELRIN, CELCON and TEFLON are trademarks of their respective trademark owners. The threaded portion 130 of the nut body 116 is preferably harder than the annular recessed ring 151 which is preferably ductile and adapted to deform to form a bulb 152 in response to an installation force applied to the fastener 110. The annular recessed ring 151 is optionally locally induction annealed in order to facilitate bulb 152 formation. The reduced wall 148 thickness of the annular recessed ring 151 additionally facilitates bulb 152 formation against the blind side workpiece 126 in substantially all grip ranges of the fastener 110. While the nut body 116 is shown a unitary or integral component, one of ordinary skill in the art would appreciate that the annular recessed ring 151 integrally connected to the internal smooth portion 150 could be a separate component from the threaded portion 130 of the nut body. In FIG. 11, an alternative embodiment of the nut body 116 is shown to illustrate that the present invention encompasses nut bodies 116 that are made of a plurality of components as well as one piece nut bodies 116.

The sleeve 114 has a body that has a cylindrical shape with a smooth exterior surface that has a slight clearance fit or press fit through openings 120 and 122 of the workpieces 124 and 126. The sleeve 114 also has a head 142 at one end that is typically sunk flush with the outside surface of the accessible side workpiece 124. Alternatively, the head 142 could be protruding from the outer surface of the accessible side workpiece 124. The head 142 could have a round head, hex head or other suitable shape as is well known in the fastener industry. The sleeve 114 has a conically tapered end 144 that projects rearwardly past the blind side workpiece 126. The conically tapered end 144 forms an angle of about 15° to 30° to an axis that passes along the length of the sleeve 114. The tapered end 144 may be knurled, abraded, notched or provided with any number of alternative frictional surfaces to promote engagement of the nut body 116 with the tapered end 144. The sleeve 114 has an internal smooth portion 146 that is adapted to receive the smooth portion 132 of the pin member 112.

Figure 9:
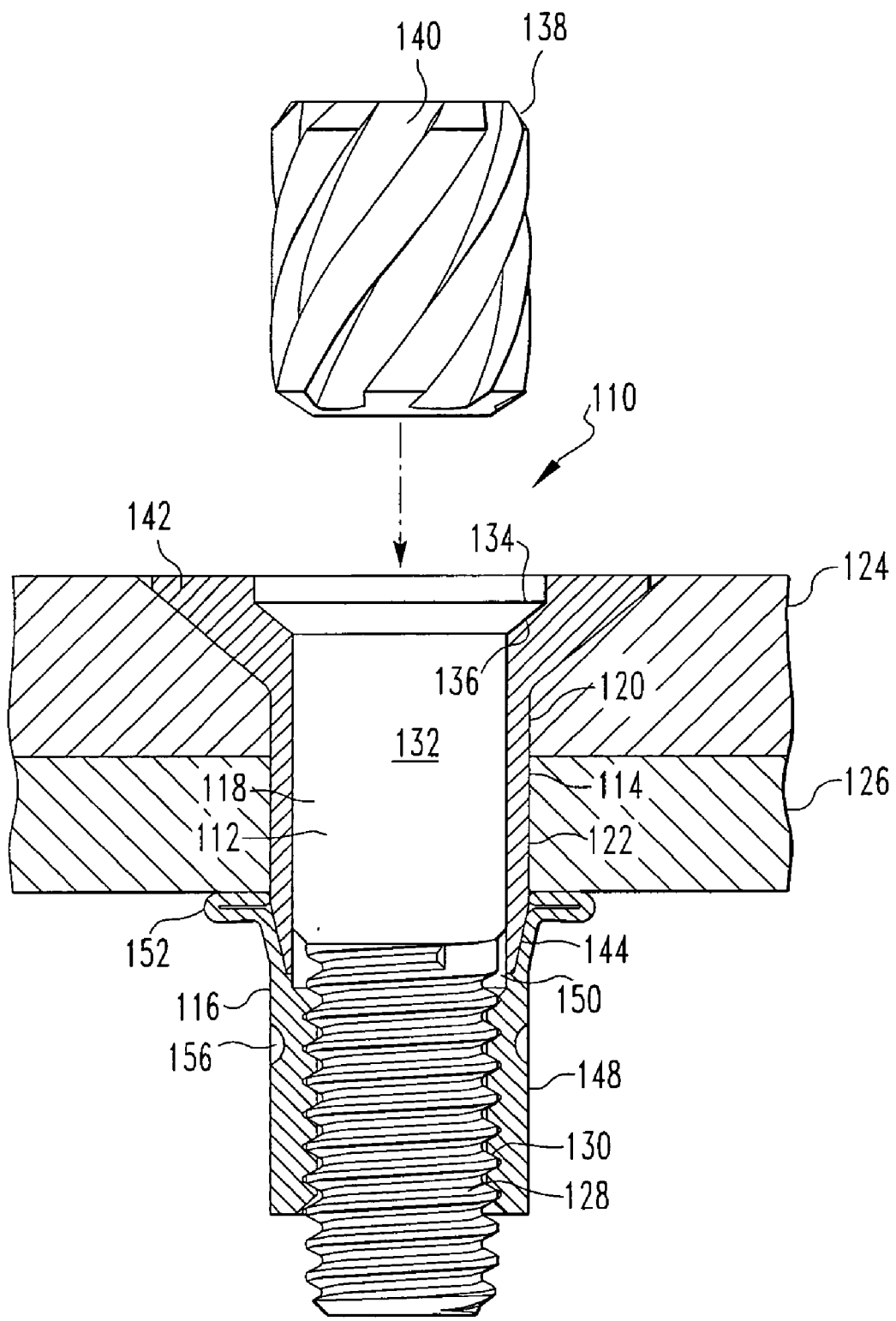
FIG. 9 is a partial cross-sectional view of an alternative embodiment of the fastener of the present invention showing the components of the fastener after the fastener has been inserted through aligned openings in a plurality of workpieces and has been set.
Figure 10A:
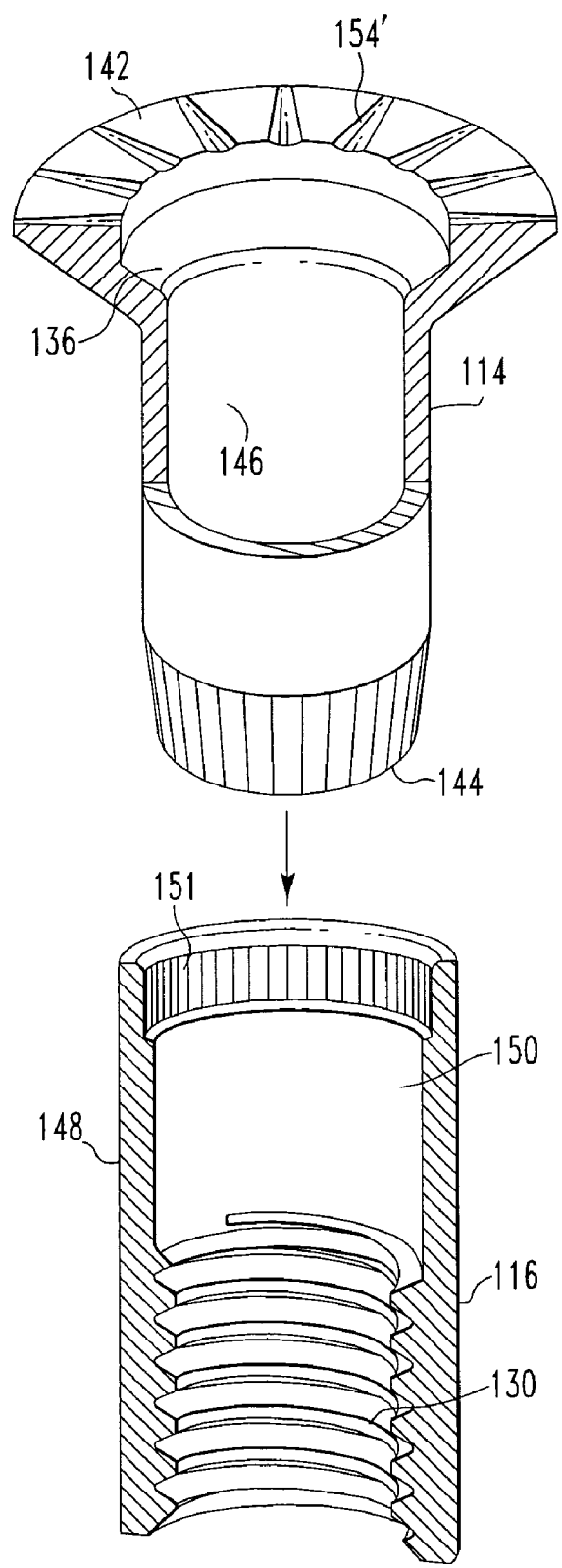
FIG. 10A is a cross-sectional isometric view of the sleeve and the nut body of an alternative embodiment of the fastener of the present invention showing an alternative embodiment of a plurality of sloped recesses disposed in the head of the sleeve.

With reference to FIG. 10, the head 142 of the sleeve 114 has a plurality of recesses 154 disposed therein that are adapted to receive a plurality of protruding nibs 56 of the nose 58 of FIG. 4. The configuration of the recesses 154 and the nibs 56 may be of any of the configurations previously disclosed for the recesses 54 and the nibs 56 for the fastener 10 of FIGS. 1–3 and 6 and for the recesses 54' and the nibs 56' for the fastener 10 of FIGS. 3A and 4A. For the sake of being concise, that particular disclosure will not be repeated here for the fastener 110 of FIGS. 8–12, it being noted that the configurations used for the recesses 54, 54' and the nibs 56, 56' for the fastener 10 are equally applicable to the recesses 154, 154' and the nibs 56, 56' for the fastener 110. For example, as shown in FIG. 10A, recesses 154' could be provided that have a sunburst configuration or daisy petal configuration. The recesses 154' extend radially outwardly in the head 142 of the sleeve 114, slope rearwardly toward the blind side workpiece 26 and are relatively shallow.

Figure 12:
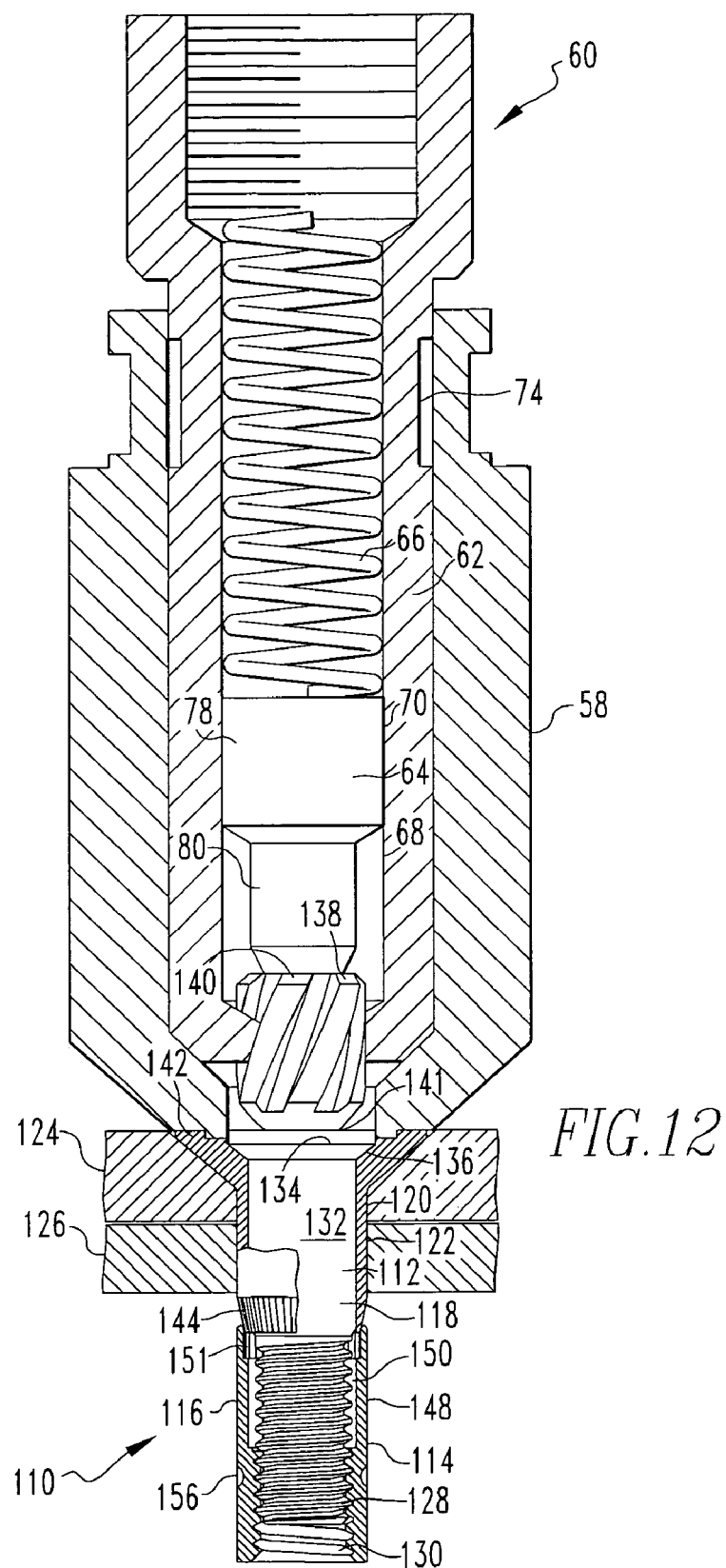
FIG. 12 is a partial cross-sectional view of an alternative embodiment of the fastener and nose assembly of the present invention showing the components of the fastener and the nose assembly engaged with the fastener after the fastener has been inserted through aligned openings in a plurality of workpieces.

With reference to FIG. 12, a nose assembly 60 is shown that is attached to a standard rotary installation tool (not shown). Details of the installation tool have been omitted for the purpose of simplifying the FIGS. and describing the details of the present invention it being noted that the nose assembly 60 could be attached to any number of standard rotary installation tools with minor modifications to the nose assembly 60 in order to secure the nose assembly 60 to such installation tools. The configuration of the nose assembly 60 shown in FIG. 12 is identical to the configuration of the nose assembly 60 shown in FIG. 6. For the sake of being concise, the particular disclosure addressing the operation of the nose assembly 60 of FIG. 6 and the interaction of the nibs 56 with the complementary shaped recesses 54 and the splines or threads 72 with the complementary shaped splines or threads 40 of the fastener 10 will not be repeated here for the fastener 110 of FIGS. 8–12, it being noted that the description of the operation of the nose assembly 60 of FIG. 6 is identical to the operation of the nose assembly of FIG. 12 and the interaction of the nibs 56 with the complementary shaped recesses 154 and the splines or threads 72 with the complementary shaped splines or threads 140 of the fastener 110 is similar to the interaction of the nose assembly 60 with the fastener 10.

Prior to installing the fastener 110 into workpieces 124 and 126, the fastener 110 is assembled. Referring to FIG. 8, the assembly process comprises a series of steps which result in the threaded portion 130 of the nut body 116 sufficiently threaded onto the threaded portion 128 of the pin member 112 such that the annular recessed ring 151 engages the tapered end 144 of the sleeve 114. As previously disclosed, either the tapered end 144 or the annular recessed ring 151 or both of the tapered end 144 and the annular recessed ring 151 may be provided with knurling, abrading, notching or frictional enhanced surfaces to promote engagement of the nut body 116 with the tapered end 144. The knurling, abrading, notching or frictional enhanced surfaces insures that the nut body 116 and the pin member 112 will not turn together upon rotation of the pin member 112. Next, the nut body 116 undergoes a dimpling process to created a dimple 156 wherein a small portion of an outer surface of the nut body 116 is physically deformed against the pin member 112. The dimpling process results in a small portion of the nut body 130 material being displaced against the pin member 112 to cause sufficient engagement to prevent loosening of the pin member 112 from vibration after installation. Preferably, the dimpling is performed on the exterior surface of the nut body 116 adjacent to that portion of the nut body 116 that is threadedly engaged with the pin member 112. The assembly process of the fastener 110 is then complete and the fastener 110 is prepared for installation.

The installation of the assembled fastener 110 involves the fastener 110 being used to secure a plurality of workpieces 124 and 126 together. The fastener 110 is inserted through aligned openings 120 and 122 in the workpieces 124 and 126 wherein the head 142 of the sleeve 114 is received against the outer surface of the accessible side workpiece 124, and the tapered end 144 of the sleeve 114 extends out from the workpiece 126 and is adjacent to the outer surface of the blind side workpiece 126. The nut body 116 is also located adjacent to the blind side workpiece 126.

A rotary installation tool (not shown) with nose assembly 60 is provided to set the fastener 110. The splines or threads 140 of the pin member 112 are engaged with the complementary shaped splines or threads 72 of the driver 62. Upon actuation of the tool by the end-user, the driver 62 is rotatably driven within the bore 68 of the nose 58 while the nose 58 is held stationary relative to the driver 62. The splined engagement between the pin member 112 and nose assembly 60 simultaneously pulls the nose assembly 60 towards the fastener 110 during actuation of the tool to ensure proper engagement of the nibs 56 with the recesses 154 and rotatably torques the pin member 112 to effectively form the bulb 152 of the fastener 110. Relative axial movement of head 138 pushes ejector 64 within the internal bore 70 of the driver 62 that does not have splines and compresses spring 66 as shown in FIG. 12. As the pin member 112 is rotatably torqued and a relative axial force is applied to the nose assembly 60 during actuation of the installation tool, the nibs 56 of the nose 58 engage the complementary shaped recesses 154 of the sleeve 114 which prevents the sleeve 114 from rotating relative to the nose 58 since the nose 58 is held stationary relative to the rotatably driven driver 62. Also, the rearward slope of the nibs 56 and nose 58 towards the blind side workpiece 126 prevents the nose 58 from camming out of the recesses 154 during the installation of the fastener 110. As previously mentioned, the problems associated with cam-outs related to the design of U.S. Pat. No. 2,971,425 are eliminated with the approach of the present invention.

As the installation tool rotates the pin member 112 and holds the sleeve 114 stationary, it is significant to note that there is no abrading or scratching of the head 142 of the sleeve 114 by the nibs 56 of the nose 58. Due to the engagement that is maintained between the nibs 56 and the recesses 154 during installation of the fastener 110, no slipping of the sleeve 114 relative to the nose 58 can occur. The recesses 154 and the nibs 56 are sloping rearwardly towards the blind side workpiece 126 and, as a result, provide consistent and predictable results and no slipping between the sleeve 114 and the nose 58 due to cam-outs.

The installation load applied by the installation tool results in the pin member 112 being threaded further into the threaded portion 130 of the nut body 116 at one end of the nut body 116 which pulls the annular recessed ring portion 151 of the nut body 116 at another end of the nut body 116 over the tapered end 144 of the sleeve 114. Pulling the recessed ring portion 151 over the tapered end 144 by threading the pin member 112 further into the threaded portion 130 of the nut body 116 deforms the recessed ring portion 151 and expands the recessed ring portion 151 over the tapered end 144 and the adjacent cylindrical portion of the sleeve 114 into the bulb 152 as shown in FIG. 9 until an outer end of the recess ring portion 151 is firmly seated against the blind side workpiece 126 to secure the plurality of workpieces 124 and 126 together. Alternatively, in the embodiment that uses an insert (not shown) in the recessed ring portion 151, the insert would cause the recessed ring portion 151 to buckle radially outwardly to form a large bulb 152. In particular, by continuing to thread the pin member 112 into the threaded portion 130 of the nut body 116, the insert and the recessed ring portion 151 would proceed over the tapered end 144 of the sleeve 114 where the insert would become lodged between the nut body 116 and the tapered end 144 to cause the recessed ring portion 151 to buckle radially outwardly to form a large bulb 152.

When the bulb 152 is fully formed, further rotation of the pin member 112 stops. At this point, torsional load builds up in the pin member 112 and the breakneck groove 141 will fracture in torsional shear and break away along with the head 138 as shown in FIG. 9. At this point, the spring 66 applies force against ejector 64 which ejects the severed head 138 from the nose assembly 60. Since the first diameter portion 78 has a diameter greater than the diameter of the internal bore 70 that has splines 72 disposed thereon, the ejector 64 remains within the internal bore 70 after the fastener 110 has been set. As shown in the FIG. 9, the head 138 breaks away from the pin member 112 without any damage to the head 142. The remaining portion of the pin member 112 is flush with the outer surface of the head 142 of the sleeve 114.

Having described the presently preferred embodiments, it is to be understood that the invention may be otherwise embodied within the scope of the appended claims.

What is claimed is:

1. A blind fastener in combination with an installation tool, the blind fastener for securing a plurality of workpieces together in response to a relative rotational force applied to the blind fastener, the workpieces having an accessible side workpiece and a blind side workpiece, the combination comprising:
    a generally tubular sleeve received within openings in the workpieces, the sleeve having a rearward tapered end at one end of the sleeve that projects rearwardly beyond the blind side workpiece, an enlarged body head at another end of the sleeve for engagement with an outer surface of the accessible side workpiece and an internally smooth portion between the tapered end and the head, the head having a generally smooth exterior surface with a plurality of rearwardly sloping recesses disposed in the generally smooth exterior surface in the head of the sleeve;
    a pin member having an elongated shank, the shank having a straight smooth portion received within the smooth portion of the sleeve and a threaded portion at one end of the pin member projecting rearwardly beyond the blind side workpiece, the pin member having a first head adjacent to the shank that is seated within the sleeve and a second splined head adjacent to the first head, the pin member having a breakneck groove between the first head and the second head, the breakneck groove being adapted to fracture in torsional shear in response to the relative rotational force applied to the fastener with a splined driver engaging the second splined head during actuation of the installation tool; and
    a nut body having an internally threaded bore at one end of the nut body threadedly engaged with the threads of the pin member and another end of the nut body made of a deformable material which is located adjacent to the rearward tapered end of the sleeve,
    wherein the installation tool has a plurality of rearwardly sloping nibs disposed on one end of a nose,
    wherein the nibs engage the recesses disposed in the head of the sleeve, do not cam out of the recesses and hold the sleeve stationary during actuation of the installation tool,
    wherein the driver facilitates threading of the threads of the pin member with the threads of the nut body during actuation of the installation tool to deform the other end of the nut body into a bulb to secure the plurality of workpieces together by pulling the nut body over the rearward tapered end of the sleeve into engagement with the blind side workpiece.

2. The combination of claim 1 wherein the nose has the plurality of nibs made of a non-deformable material.

3. The combination of claim 1 further comprising a plurality of dimples disposed on the nut body to physically engage a portion of the nut body with the pin member to create a friction lock between the nut body and the pin member.

4. The combination of claim 1 wherein the recesses are relatively shallow.

5. The combination of claim 1 wherein the nut body is a unitary component.

6. The combination of claim 1 wherein the nut body is made of a plurality of components.

7. The combination of claim 1 wherein the tapered end is provided with a frictional surface selected from the group consisting of knurling, abrading and notching.

8. The combination of claim 1 wherein the other end of the nut body has an annular recessed ring disposed therein.

9. The combination of claim 8 wherein the annular recessed ring is provided with a frictional surface selected from the group consisting of knurling, abrading and notching.

10. A blind fastener in combination with a nose assembly secured to an installation tool for securing a plurality of workpieces together, the combination comprising:
    the blind fastener having a sleeve and a pin member, the sleeve having a head that has a generally smooth exterior surface with a plurality of rearwardly sloping recesses disposed therein, the pin member having a splined head that breaks away from the blind fastener after the blind fastener has been set;
    a nose having an internal bore, one end of the nose having a plurality of rearwardly sloping nibs disposed thereon that engage the rearwardly sloping recesses disposed in the generally smooth exterior surface of the sleeve; and
    a driver having an internal bore, one end of the driver having a portion of the internal bore having splines disposed therein that engage the splined head of the pin member to facilitate threading of the pin member with a nut body in response to the relative rotational force applied to the fastener with the driver, the driver being disposed within the internal bore of the nose and rotatably movable within the bore relative to the nose,
    wherein the nibs do not cam out of the recesses and hold the sleeve stationary during actuation of the installation tool.

11. The combination of claim 10 wherein the nut body has an internally threaded bore at one end of the nut body that is threadedly engaged with the pin member and another end of the nut body is made of a deformable material which is located adjacent to a rearward tapered end of the sleeve,
    wherein the driver facilitates threading of the pin member with the nut body during actuation of the installation tool to deform the other end of the nut body into a bulb to secure the plurality of workpieces together by pulling the nut body over the rearward tapered end of the sleeve into engagement with the blind side workpiece.

12. The combination of claim 10 wherein the recesses are relatively shallow.

13. The combination of claim 10 wherein the nut body is a unitary component.

14. The combination of claim 10 wherein the nut body is made of a plurality of components.

15. A blind fastener in combination with an installation tool, the blind fastener for securing a plurality of workpieces together in response to a relative rotational force applied to the blind fastener, the workpieces having an accessible side workpiece and a blind side workpiece, the combination comprising:

a sleeve having a body that is internally threaded at one end of the sleeve and a head at another end of the sleeve, the threaded portion of the sleeve being adjacent to an internally smooth portion of the sleeve, the threaded portion of the sleeve transitioning to the smooth portion of the sleeve, the smooth portion of the sleeve having a reduced wall thickness relative to the threaded portion of the sleeve, the head having a generally smooth exterior surface with a plurality of rearwardly sloping recesses disposed in the generally smooth exterior surface in the head of the sleeve; and a pin member having an elongated shank, the shank having a straight smooth portion received within the smooth portion of the sleeve and a threaded portion at one end of the pin member threadedly engaged with the threaded portion of the sleeve, the pin member having a first head adjacent to the shank that is seated within the sleeve and a second splined head adjacent to the first head, the pin member having a breakneck groove between the first head and the second head, the breakneck groove being adapted to fracture in torsional shear in response to the relative rotational force applied to the fastener with a splined driver engaging the second splined head that facilitates threading of the threads of the pin member with the threads of the sleeve during actuation of the installation tool, wherein the installation tool has a plurality of rearwardly sloping nibs disposed on one end of a nose, wherein the nibs engage the recesses disposed in the head of the sleeve, do not cam out of the recesses and hold the sleeve stationary during actuation of the installation tool, and wherein the portion of the sleeve that is of a reduced wall thickness relative to the threaded portion of the sleeve and is adjacent to an outer surface of the blind side workpiece is annealed to facilitate deformation into a bulb to secure the plurality of workpieces together in response to the rotational force applied to the fastener with the installation tool.

16. The combination of claim 15 wherein the wall thickness of the sleeve is gradually reduced along the smooth portion of the sleeve adjacent to the threaded portion of the sleeve to a point adjacent to the outer surface of the blind side workpiece.

17. The combination of claim 15 wherein the wall thickness of the smooth portion of the sleeve adjacent to the threaded portion of the sleeve is abruptly reduced by a step in the sleeve to a wall thickness that is of a reduced wall thickness relative to the threaded portion of the sleeve.

18. The combination of claim 15 wherein the nose has the plurality of nibs made of a non-deformable material.

19. The combination of claim 15 further comprising a plurality of dimples disposed on the body of the sleeve to physically engage a portion of the sleeve with the pin member to create a friction lock between the sleeve and the pin member.

20. The combination of claim 15 wherein the recesses are relatively shallow.

* * * * *